United States Patent
Lee et al.

(10) Patent No.: US 6,784,723 B2
(45) Date of Patent: Aug. 31, 2004

(54) HIGH VOLTAGE GENERATION CIRCUIT

(75) Inventors: Sang-Kwon Lee, Ichon-shi (KR);
Joon-Ho Kim, Ichon-shi (KR);
Young-Jun Nam, Ichon-shi (KR);
Kwang-Rae Cho, Ichon-shi (KR);
Byung-Jae Lee, Ichon-shi (KR)

(73) Assignee: Hyundai Electronics Industries Co., Ltd. (KR)

( * ) Notice: Subject to any disclaimer, the term of this patent is extended or adjusted under 35 U.S.C. 154(b) by 0 days.

(21) Appl. No.: 09/896,133

(22) Filed: Jun. 29, 2001

(65) Prior Publication Data

US 2002/0033731 A1 Mar. 21, 2002

(30) Foreign Application Priority Data

Jun. 30, 2000 (KR) ........................................ 2000-36944

(51) Int. Cl.[7] .................................................. G05F 3/02
(52) U.S. Cl. ...................................... 327/536; 327/539
(58) Field of Search ................................ 327/534, 535, 327/536, 537; 363/59

(56) References Cited

U.S. PATENT DOCUMENTS

| | | | | |
|---|---|---|---|---|
| 4,961,007 A | * | 10/1990 | Kumanoya et al. | 323/313 |
| 5,561,385 A | * | 10/1996 | Choi | 327/536 |
| 5,982,222 A | * | 11/1999 | Kyung | 327/536 |
| 6,225,854 B1 | * | 5/2001 | Cha | 327/536 |
| 6,285,622 B1 | * | 9/2001 | Haraguchi et al. | 327/536 |
| 6,320,457 B1 | * | 11/2001 | Yang | 327/536 |

* cited by examiner

Primary Examiner—Terry D. Cunningham
(74) Attorney, Agent, or Firm—Townsend and Townsend and Crew LLP

(57) ABSTRACT

The present invention is a high-voltage generation circuit configured to sequentially activate a plurality of high-voltage pump circuits to precisely pump a level of high voltage. In one embodiment, the high-voltage generation circuit includes a high-voltage level detection unit for outputting a high-voltage detected signal, a high-voltage pump control unit for generating a control signal responsive to a detected signal, an oscillator for generating a pulse signal for driving a plurality of high-voltage pumps, a sequential delay unit for sequentially delaying the pulse signal from the oscillator, and a plurality of high-voltage pumps for pumping the high voltage based on a delayed pulse signal and the control signal.

2 Claims, 8 Drawing Sheets

HIGH VOLTAGE GENERATION CIRCUIT

CROSS-REFERENCES TO RELATED APPLICATIONS

This application claims priority from Korean Application, entitled "High Voltage Generation Circuit" Application No. 2000-36944 and filed on Jun. 30, 2000 and incorporates by reference its disclosure for all purposes.

BACKGROUND OF THE INVENTION

1. Field of the Invention

The present invention relates to a high-voltage generation circuit and in particular, to a high-voltage generation circuit which is capable of sequentially enabling a high-voltage pump to obtain high-precision pumping, to thereby generate a stabilized high voltage.

2. Description of the Prior Art

In a semiconductor device using an external power supply, a high-voltage generation circuit is widely used. Because the high-voltage generation circuit generates a voltage higher than the external power supply of the threshold voltage of a transistor, the circuit can compensate for a loss of threshold voltage.

FIG. 1 is a schematic block diagram of a conventional high-voltage generation circuit. As shown in this FIG., a conventional high-voltage generation circuit includes a high-voltage level detection unit 1, a high-voltage pump control unit 2, an oscillator 3, a plurality of high-voltage pumps 41, 42–4N, and a high-voltage clamping unit 5.

The high-voltage level detection unit 1 detects an input of voltage VPP and generates both a detection signal DET to produce a stable voltage of VPP and a clamping active signal CLMP. High-voltage pump control unit 2 generates a high-voltage pump control signal VPPEN in response to detected signal DET from high-voltage level detection unit 1.

In response to the high-voltage pump control signal VPPEN, oscillator 3 generates both a pulse signal OSC for driving the plurality of high-voltage pumps 41, 42–4N, and a pump active signal PACT for controlling pumps 41, 42–4N. Pumps 41, 42–4N then pump to obtain a high voltage level under the control of the pulse signal OSC and the pump active signal PACT. High-voltage clamping unit 5 operates to clamp the level of high voltage based on the clamping active signal CLMP from high-voltage level detection unit 1.

FIG. 2 is a detailed block diagram of one of the plurality of high-voltage pumps 41, 42-N shown in FIG. 1. In FIG. 2, a high-voltage pump 41 includes a first NAND gate ND1, a first through a fourth NOR gate NOR1 to NOR4, a first through a fourth precharge capacitor C1 to C4, a first and a second NMOS transistor NM1 and NM2, and a first and a second PMOS transistor PM1 and PM2. Specifically, the first NAND gate ND1 performs a NAND operation on an inverted pump active signal PACT signal from first inverter INV1 and the pulse signal OSC.

First NOR gate NOR1 performs an OR operation on the output of first NAND gate ND1 and the outputs consecutively processed through second inverter INV2. Second NOR gate NOR2 and a fourth inverter INV4 outputs the resultant data signal to a third inverter INV3 through NOR1. Second NOR gate NOR2 performs an OR operation on the output of third inverter INV3 and the output of second inverter INV2, and outputs the resultant data signal to fourth inverter INV4.

Third NOR gate NOR3 performs an OR operation on the output of third inverter INV3 and the output of a fifth inverter INV5. INV5 operates to invert the output of the third inverter INV3, and the resultant data signal is output as first pump driving signal G1. Fourth NOR gate NOR4 performs an OR operation on the output of fourth inverter INV4 and the output of a sixth inverter INV6. INV6 functions to invert the output of fourth inverter INV4, and the resultant data signal is output as a second pump driving signal G2.

A first precharge capacitor C1 precharges the high-voltage pump based on first pump driving signal G1 from third NOR gate NOR3. A second precharge capacitor C2 precharges the high-voltage pump based on second pump driving signal G2 from fourth NOR gate NOR4. A third capacitor C3 pumps the high voltage based on output R1 of third inverter INV3, and a fourth capacitor C4 pump high voltage based on the output R2 of fourth inverter INV4.

A first NMOS transistor NM1 is configured to enable the output of first precharge capacitor C1 to precharge the high-voltage pump by using an external supply voltage VEXT. A second NMOS transistor NM2, is configured to enable the output of second precharge capacitor C2 to precharge the high-voltage pump by using the external supply voltage VEXT.

A first PMOS transistor PM1, having a gate coupled to a precharged node of second NMOS transistor NM2 functions to transmit the high voltage to a Vpp node. A second PMOS transistor PM2, having a gate coupled to a precharged node of first NMOS transistor NM1 operates to transmit the high voltage. In one embodiment, PM1 and PM2 transmit the high voltage at different times, according to, for example, the signal OSC.

A detailed explanation of the operation of a conventional high-voltage generation circuit follows. First, the level of high voltage is reduced, over time, to a non-conforming level. High-voltage level detection unit 1 outputs a detected signal DET smaller (i.e., less) than the internal power supply VDD, which is the core power supply of the DRAM.

Accordingly, high-voltage pump control unit 2 outputs a high-voltage pump control signal VPPEN at a high level (e.g., VDD). Accordingly, oscillator 3 outputs pump active signal PACT at a low level (i.e., a low logic level such as Vss) and pulse signal OSC at a periodic low level.

Each of the plurality of high-voltage pumps-41–4N function to simultaneously perform a voltage pumping operation in response to pump active signal PACT and pulse signal OSC.

FIGS. 3A and 3B are timing views illustrating the operation of a conventional high-voltage generation circuit. As shown in FIGS. 3A and 3B, the high-voltage level (e.g., VPP) is greatly increased each cycle of the pulse signal OSC of oscillator 3. If the high voltage increases to a certain high level beyond maximum level of voltage, detected signal DET from detection unit 1 initiates high-voltage pump control signal VPPEN logic low, thus disabling the plurality of high-voltage pumps 41–4N to halt charge pumping.

In this case, the high-voltage level is sequentially reduced over time and is quickly dropped down into a conforming or acceptable range of high-voltage levels during an active mode rather than during a standby mode.

As mentioned above, if the high voltage level drops to a level less than a certain level, the procedure discussed above is repeated to recommence the voltage pumping.

Conversely, if high voltage rises to a level higher than a maximum high voltage level, high-voltage level detection unit 1 enables the clamping active signal CLMP to perform the clamping operation, preventing the high-voltage level from rising excessively. The use of high-voltage pumps 41–4N is well-known in the art and therefore, a description of their operation is omitted.

As shown in FIG. 3B, the conventional high-voltage generation circuit described above simultaneously activates the plurality of high-voltage pumps 41–4N, and the high-voltage level VPP rises in a chopping wave fashion during one cycle of the pulse signal OSC of oscillator 3.

At the instant high-voltage pump control signal VPPEN transitions to a logic low, the pulse signal OSC of oscillator 3 transistors to a logic high to allow the plurality of high-voltage pumps 41–4N to be simultaneously activated. As a result, an increase in the high-voltage level is produced.

During an actual pumping operation, after high-voltage level is detected, feedback to the high-voltage pump control signal VPPEN causes a delay, resulting in an increased voltage that exceeds a desired maximum high-voltage level.

Accordingly, the conventional high-voltage generation circuit suffers from the drawback that if the high-voltage level is greatly varied, an excessive level of stress may be applied to the memory cell causing a back-bias voltage variance. Such a variance is due to the coupling of well capacitance and results in a degraded cell refresh property.

SUMMARY OF THE INVENTION

The present invention provides a high-voltage generation circuit which is capable of sequentially activating a plurality of high-voltage pump circuits, thereby precisely maintaining a level of high voltage within a small range of voltage levels.

In accordance with a specific embodiment of the present invention, there is provided a high-voltage generation circuit, comprising a high-voltage level detection means for detecting a high-voltage level, a high-voltage pump control means for generating a control signal responsive to a detected signal at the high-voltage level detection means, an oscillator, responsive to the control signal, for generating a pulse signal for driving a plurality of high-voltage pumps, a sequential delay means having a multiplicity of delay elements for sequentially delaying the pulse signal from the oscillator, and a plurality of high-voltage pumps for pumping high voltage under the control of a delayed pulse signal outputted from the multiplicity of delay elements in the sequential delay means and the control signal from the high-voltage level detection means.

BRIEF DESCRIPTION OF THE DRAWINGS

The above and other features of the present invention will become apparent from the following description of the specific embodiments given in conjunction with the accompanying drawings, in which.

DETAILED DESCRIPTION OF THE SPECIFIC EMBODIMENTS

Figure 1:
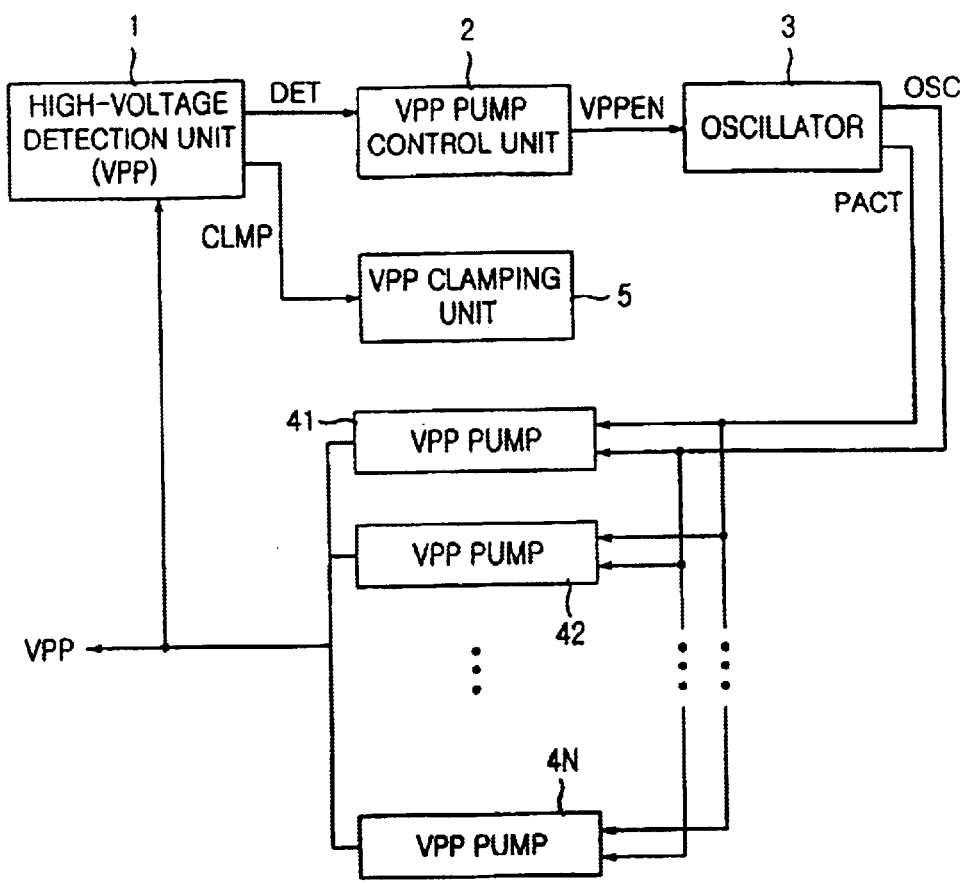
FIG. 1 is a schematic block diagram of a conventional high-voltage generation circuit.
Figure 2:
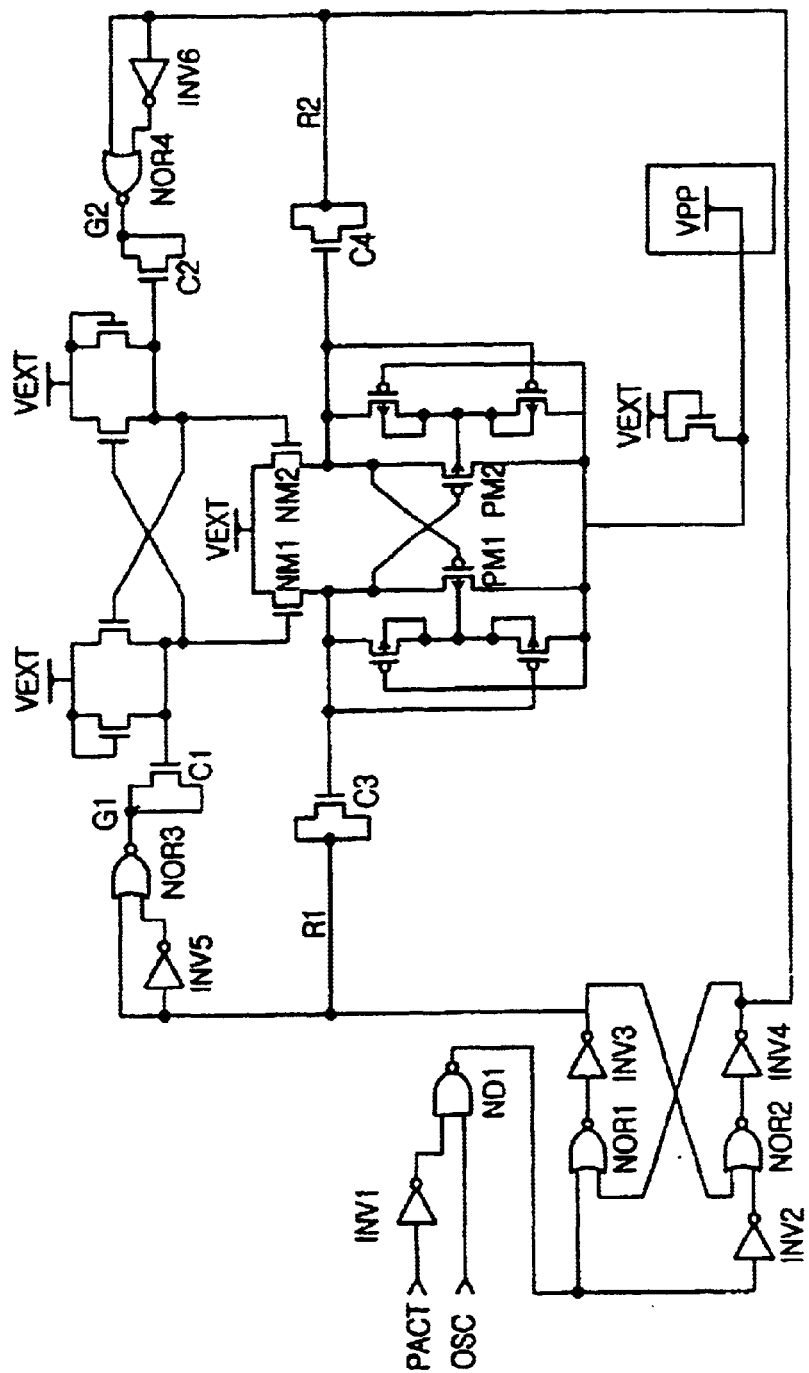
FIG. 2 is a detailed block diagram of one of the plurality of the high-voltage pumps shown in FIG. 1.
Figure 3A:
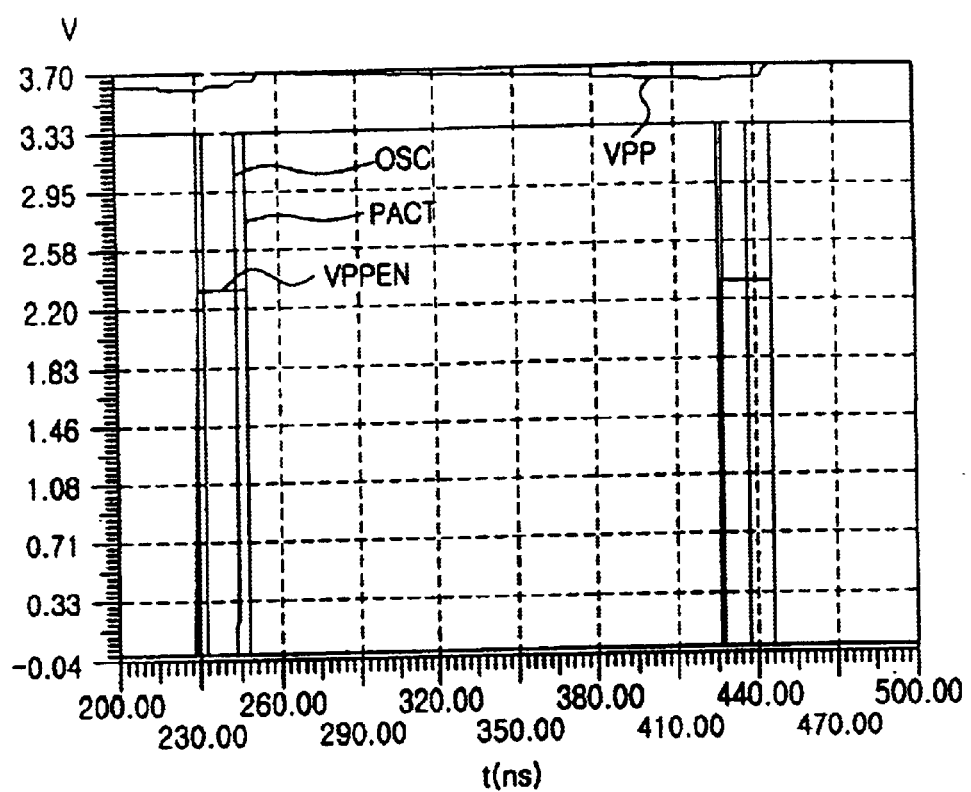
FIGS. 3A and 3B are timing views illustrating the operation of a conventional high-voltage generation circuit.
Figure 3B:
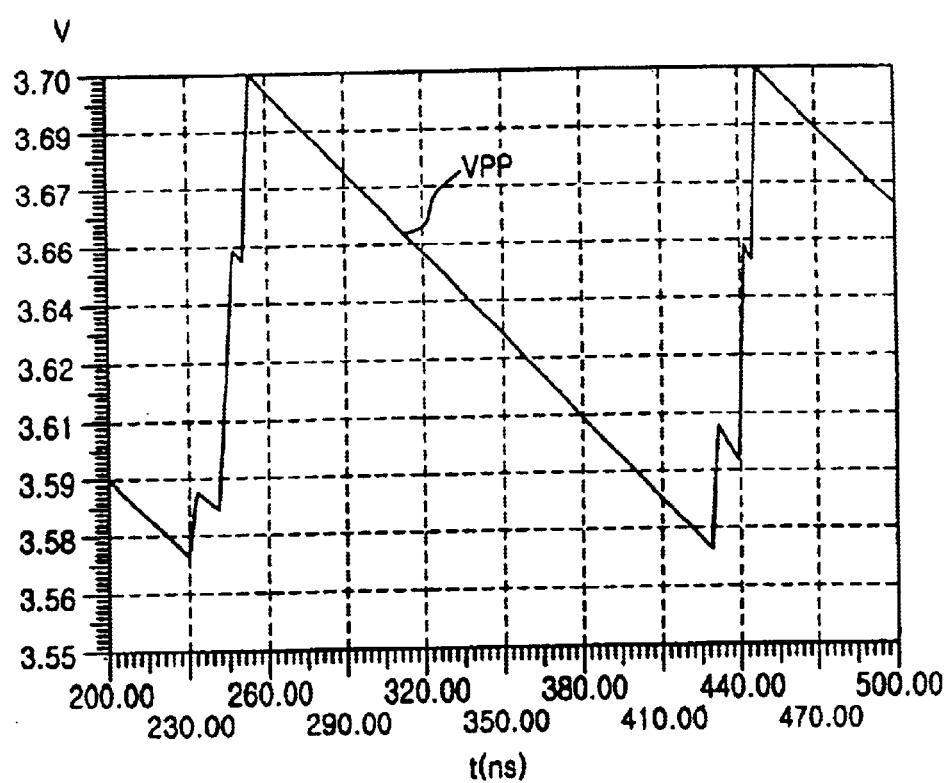
Figure 4:
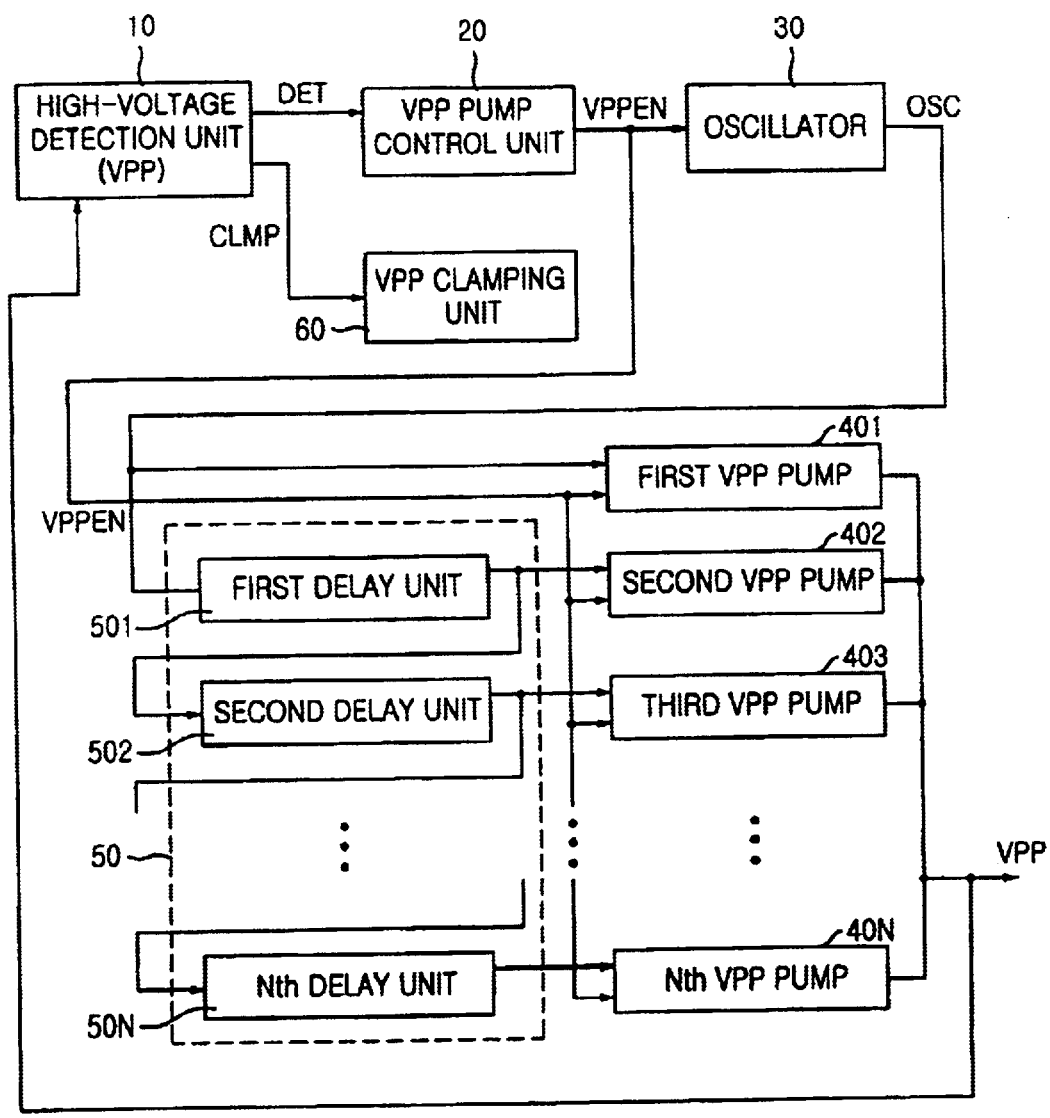
FIG. 4 is a schematic block diagram of a high-voltage generation circuit in accordance with a specific embodiment of the present invention.

FIG. 4 is a schematic block diagram of a high-voltage generation circuit in accordance with a specific embodiment of the present invention. As shown in this FIG., the high-voltage generation circuit of the present invention comprises a high-voltage level detection unit 10, a high-voltage pump control unit 20, an oscillator 30, a plurality of high-voltage pumps 401–40N, a sequential delay unit 50 and a high-voltage high voltage clamping unit 60.

High voltage level detection unit 10 detects a level of high-voltage provided externally. Unit 10 outputs a detected signal DET when a minimum voltage level is obtained and a clamping active signal CLMP upon detecting level exceeding a maximum level. High-voltage pump control unit 20 generates a high-voltage pump control signal VPPEN in response to the detected signal DET from high-voltage level detection unit 10. Oscillator 30 generates a pulse signal OSC for driving the plurality of high-voltage pumps 401–40N in response to the high-voltage pump control signal VPPEN. The plurality of high-voltage pumps 401–40N pumps a high-voltage under the control of the pulse signal OSC and the high-voltage pump control signal VPPEN. Sequential delay unit 50 sequentially delays the pulse signal OSC between oscillator 30 and pumps 401–40N.

High-voltage clamping unit 60 operates to clamp a high-voltage level when the level is higher than a maximum level, based on the clamping active signal CLMP from high-voltage level detection unit 10.

Sequential delay unit 50 includes a plurality of delays 501–50N, wherein the first delay 501 delays the pulse signal OSC from oscillator 30, the second delay 502 sequentially and further delays OSC delayed by the first delay 501 by adding another delay provided by the second delay and so on.

Figure 5:
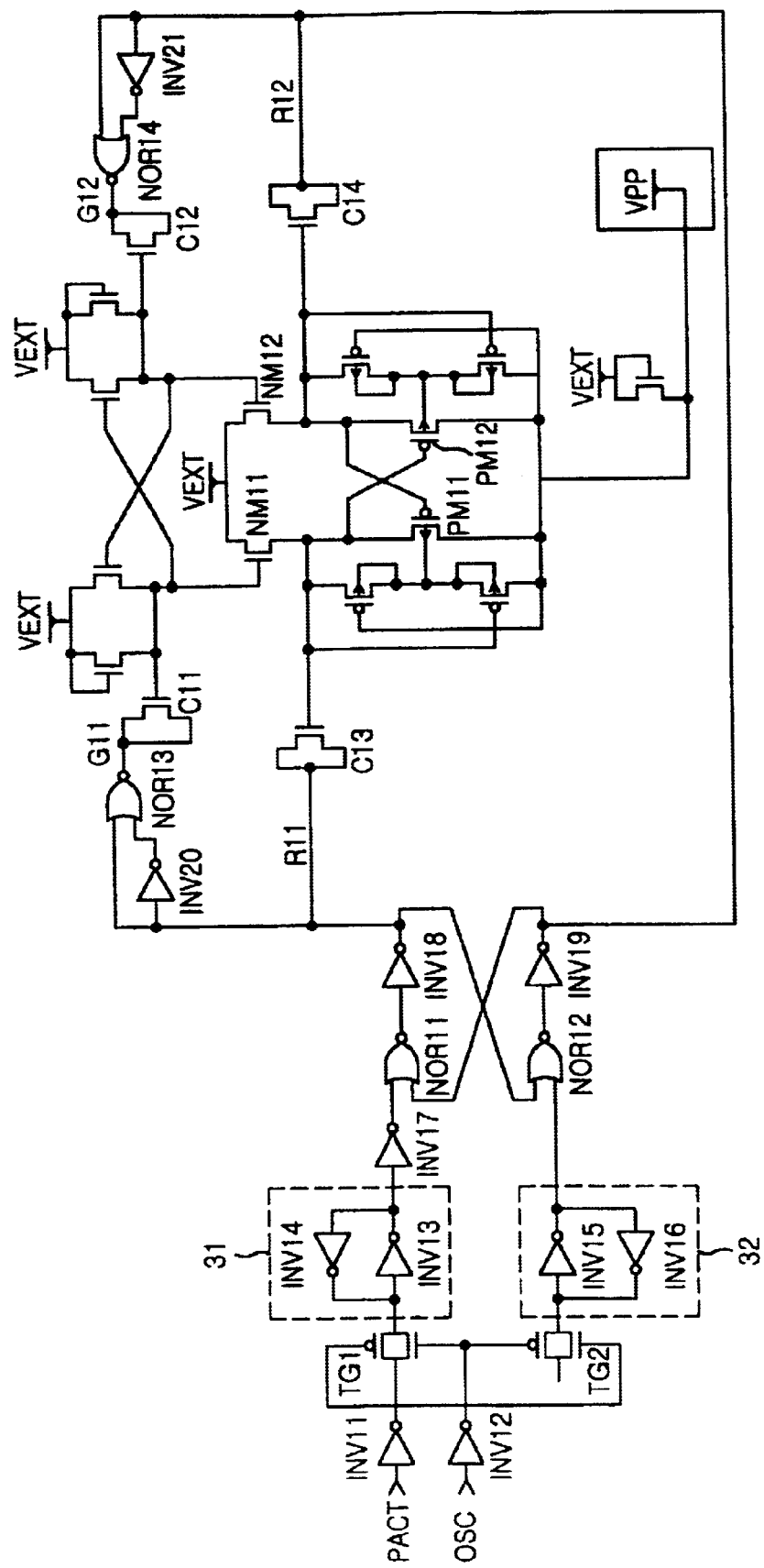
FIG. 5 is a detailed block diagram of one of the plurality of the high-voltage pumps shown in FIG. 4.

FIG. 5 is a detailed block diagram of one of the plurality of the high voltage pumps 401–40N shown in FIG. 4. As shown in this FIG., one of the exemplary high-voltage pumps, e.g., pump 401, includes first inverter INV11, first and second transmission gates TG1 and TG2, first and second latches 31 and 32, first to fourth NOR gates NOR11–NOR14, first to fourth precharge capacitors C11 and C14, first and second NMOS transistors NM11 and NM12, and first and second PMOS transistors PM11 and PM12.

Specifically, first inverter INV11 inverts the pulse signal OSC of oscillator 30 (not shown). The first and second transmission gates TG1 and TG2 selectively transmit the output of first inverter INV11 under the control of the high-voltage pump control signal VPPEN and the output of a second inverter INV12. INV12 inverts the high-voltage pump control signal VPPEN. First and second transmission gates TG1 and TG2 alternately are activated, or turned on. First and second latches 31 and 32 latch the outputs of the first and second transmission gates TG1 and TG2, respectively. First latch 31 includes a third inverter INV13 and a fourth inverter INV14, which are annularly coupled to each other as shown in FIG. 5. Second latch 32 includes a fifth inverter INV15 and a sixth inverter INV16, which also are annularly coupled to each other.

First NOR gate NOR11 performs an OR operation with the output of a seventh inverter INV17, which inverts the output of first latch 31, and the output of INV1Q sequentially processed by second NOR gate NOR12 and inverted by ninth inverter INV19. Then, NOR11 outputs the resultant data signal from INV18 to second NOR gate NOR12.

Second NOR gate NOR12 performs an OR operation with the output of second latch 32 and the output of an eighth inverter INV18, which inverts the output of first NOR gate NOR11. NOR gate NOR12 then outputs the resultant data to the ninth inverter INV19.

Third NOR gate NOR13 performs an OR operation with the output of the eighth inverter INV18 and the output of a tenth inverter INV20 which inverts the output of the eighth inverter INV18. NOR gate NOR13 then outputs the resultant data signal as a first pump driving signal G11. Fourth NOR gate NOR14 performs an OR operation with the output of the ninth inverter INV19 and the output of an eleventh inverter INV21 which inverts the output of the ninth inverter INV19. NOR gate NOR14 then outputs the resultant data as a second pump driving signal G12.

First precharge capacitor C11 precharges the high-voltage pump based on the first pump driving signal G11 from third NOR gate NOR13. Second precharge capacitor C12 precharges the high-voltage pump based on the second pump driving signal G12 from fourth NOR gate NOR14.

Third capacitor C13 pumps the high voltage based on the output R11 of eighth inverter INV18. Fourth capacitor C4 pumps the high voltage based on the output R2 of ninth inverter INV19.

First NMOS transistor NM11, which is configured to selectively enable the output of first precharge capacitor C11 is used to precharge the high-voltage pump by using an external supply voltage VEXT. Second NMOS transistor NM12, which is configured to enable the output of the second precharge capacitor C12. Each precharge capacitor is used to pre-charge the high-voltage pump by using the external supply voltage VEXT.

First PMOS transistor PM11, has a gate coupled to a precharged node of the second NMOS transistor NM12, and second PMOS transistor PM112 has a gate coupled to a precharged node of the first NMOS transistor NM11, each operating to transmit the high voltage to a high-voltage node.

A detailed explanation of the operation of an embodiment of the high-voltage generation circuit according to the present invention follows.

First, when the high-voltage level drops to or below a minimum level over time, the high-voltage level detection unit 10 outputs a detected signal DET. Signal DET is smaller than the internal power supply VDD, which is the core power supply of the device, such as a DRAM. Accordingly, high-voltage pump control unit 20 outputs the high-voltage pump control signal VPPEN at a high level (i.e., Vdd) upon detecting, a detected signal DET that has a voltage level less than the internal power supply VDD.

Thereafter, the pulse signal OSC of the oscillator 30 (not shown) transitions to a logic low from logic high upon receiving the high-voltage pump control signal VPPEN. In this case, as long as the high-voltage pump control signal VPPEN is at a logic high, the pulse signal OSC is periodically rendered logic low by sequential delay unit 50. Substantially simultaneously, the high-voltage pump control signal VPPEN is applied to each of the high-voltage pumps 401–40N to activate (i.e., turn on), turning on the first and second transmission gates TG1 and TG2. Thus, each of the high-voltage pumps 401–40N sequentially pumps high voltage VPP at each transition of the pulse signal OSC.

Further, at the instant the high-voltage pump control signal VPPEN is transitioned to a logic low level, since the pulse signal OSC is transitioned from logic high to logic low, high-voltage pumping is prevented even if the high-voltage pump control signal VPPEN is rendered logic low.

Specifically, high-voltage pumps 401–40N are sequentially activated through the use of the sequential delay unit 50 irrespective of the high-voltage pump control signal VPPEN, resulting in a continuously increased high voltage. For example, 401 is activated to pump charge, shuts off, and then after a delay, 402 is activated, etc. To prevent this, at the instant the high-voltage pump control signal VPPEN is transitioned to a logic low level, first and second transmission gates TG1 and TG2 turn on to preclude the pulse signal OSC, which has transitioned from a logic low level to a logic high level, from being applied to the first input terminals of first and second NOR gates NOR1 and NOR2.

That is, the first and second transmission gates TG1 and TG2 are turned on only when the high-voltage pump control signal VPPEN is rendered logic high; otherwise, transmission gates TG1 and TG2 are turned off. This "on" state is latched at each of first and second latches 31, 32, thereby making it possible to prevent the transition signal from being applied to the first input terminals of first and second NOR gates NOR1, NOR2 even if the high-voltage pump control signal is logic low. Accordingly, the present invention can prevent high-voltage pumps 401–40N from being needlessly activated.

Figure 6A:
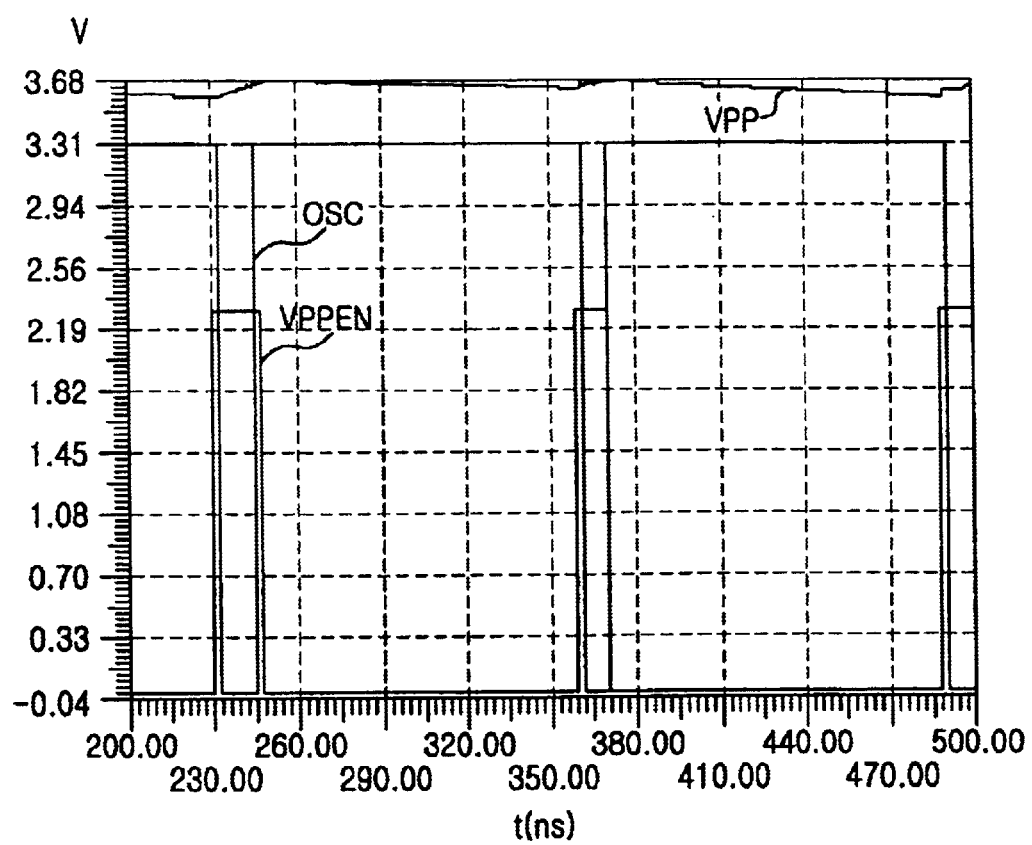
FIGS. 6A and 6B are timing views illustrating the operation of the high-voltage generation circuit of the present invention.
Figure 6B:
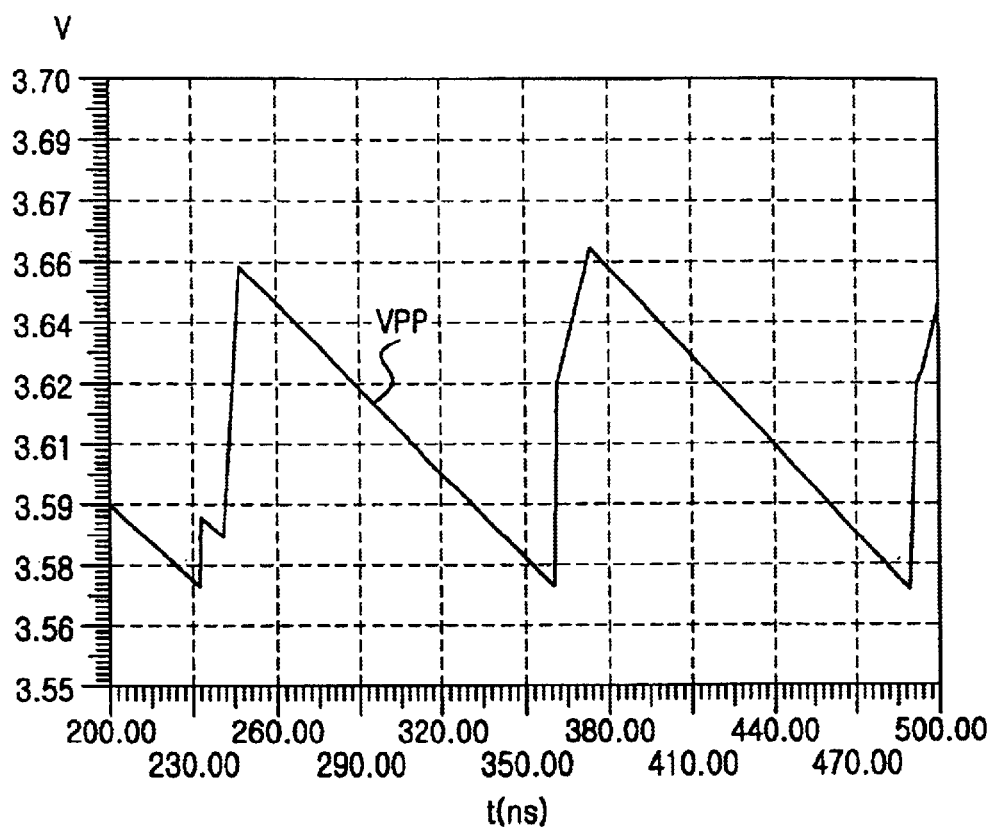

When the high-voltage pump control signal VPPEN is rendered logic high, the pulse signal OSC is generated, as shown in FIG. 6A. Thereafter, the generated pulse signal OSC is sequentially delayed at each sequential delay unit 50 of FIG. 4 to activate high-voltage pumps 401–40N. As shown in FIG. 6B, the present invention prohibits the level of high voltage from being greatly increased at one pulse of the pulse signal OSC even if the high-voltage pump control signal VPPEN is transitioned to a logic low level.

As mentioned above, the present invention sequentially activates a plurality of high-voltage pumps to precisely control the high-voltage level, thereby reducing a peak-to-peak swings between a minimum and a maximum high-voltage levels and fluctuations in back-bias voltage. According to the present invention, the high-voltage generation circuit also eliminates stress on the device circuitry, such as a memory cell or cells.

Although the specific embodiments of the invention have been disclosed for illustrative purposes, those skilled in the art will appreciate that various modifications, additions, and substitutions are possible without departing from the scope and spirit of the invention as disclosed in the accompanying claims.

What is claimed is:

1. A high-voltage generation circuit, comprising:
   a high-voltage level detection means for detecting a level of high voltage and for generating a detected signal;
   a high-voltage pump control means for generating a control signal, responsive to the detected signal of the high-voltage level detection means;
   a plurality of high-voltage pumps;
   an oscillator, responsive to the control signal, for generating a pulse signal to activate the plurality of high-voltage pumps; and
   a sequential delay means having a multiplicity of delay elements for sequentially delaying the pulse signal from the oscillator, where each of the multiplicity of delay elements provides a delayed pulse signal,
   wherein the plurality of high-voltage pumps are configured to provide a high voltage under the control of the delayed pulse signal and the control signal from the high-voltage level detection means;

wherein each pump in the plurality of high-voltage pumps includes:

a first transmission gate, responsive to the control signal;

a second transmission gate, responsive to the control signal, wherein the first and the second transmission gate are configured to selectively transmit an inverted signal for the sequentially delayed pulse signal by the sequential delay means;

a first latch configured to latch signals fed thereto from the transmission gate;

second latch configured to latch signals fed thereto from the second transmission gate;

a first logic gate;

a second logic gate, wherein the first logic gate performs a logic operation on an inverted signal for a latched signal by the first latch and the output processed at the second latch and the second logic gate, and the second logic gate performs a logic operation on the output of the second latch and an inverted signal for the output of the first logic gate; and a pumping means for pumping high voltage based on the outputs of first and second logic gates.

2. The high-voltage generation circuit of claim 1, wherein each of the first and second logic gates includes a NOR gate.

* * * * *